United States Patent

Inou

[11] Patent Number: 6,078,274
[45] Date of Patent: Jun. 20, 2000

[54] TOUCH PANEL

[75] Inventor: Ippei Inou, Nara, Japan

[73] Assignee: Sharp Kabushiki Kaisha, Osaka, Japan

[21] Appl. No.: 08/996,550

[22] Filed: Dec. 23, 1997

[30] Foreign Application Priority Data

Dec. 27, 1996 [JP] Japan .................................. 8-349164
Mar. 28, 1997 [JP] Japan .................................. 9-076385
Oct. 23, 1997 [JP] Japan .................................. 9-290834

[51] Int. Cl.[7] .................................................. G08C 21/00
[52] U.S. Cl. ......................... 341/34; 345/173; 178/18.01; 178/18.03; 340/815.41
[58] Field of Search ............... 341/31–34; 345/173–178; 700/17, 83; 178/18.05, 18.01, 18.03, 18.1, 18.11; 200/313, 311; 340/815.41, 815.47

[56] References Cited

U.S. PATENT DOCUMENTS

| | | | |
|---|---|---|---|
| 4,553,820 | 11/1985 | Harada | 350/331 R |
| 5,159,159 | 10/1992 | Asher | 178/18 |
| 5,486,485 | 1/1996 | Kim et al. | 437/41 |
| 5,847,690 | 12/1998 | Boie et al. | 345/174 |

FOREIGN PATENT DOCUMENTS

| | | |
|---|---|---|
| 7-146755 | 6/1995 | Japan . |
| 7-257945 | 10/1995 | Japan . |
| 8-195138 | 7/1996 | Japan . |

*Primary Examiner*—Donnie L. Crosland
*Attorney, Agent, or Firm*—David G. Conlin; George W. Neuner; Dike, Bronstein, Roberts and Cushman LLP

[57] ABSTRACT

A touch panel is made up of (a) an insulating substrate provided with a transparent conductive film, and (b) a flexible insulating substrate provided with a transparent conductive film. A double-sided adhesive tape combines together (a) and (b), between which is provided a spacer. Since the insulating substrate and the flexible insulating substrate are held apart by the spacer, there is a layer of air between the insulating substrate and the flexible insulating substrate. On the two transparent conductive layers are provided anti-reflective films, in the form, for example, of square islets 100 nm thick and with sides of 80 $\mu$m, with a pitch Pd of 100 $\mu$m and an interval Dw of 20 $\mu$m. Instead of providing the anti-reflective films, holes may be selectively provided in the transparent conductive films. In this way, a touch panel can be realized which enables a bright display screen without impairing input sensitivity.

28 Claims, 13 Drawing Sheets

Pd = 100 μm
Dw = 20 μm

Pd = 100 μm
Dw = 10 μm

Pd = 100 μm
Dw = 40 μm

Pd = 100 μm
Dw = 70 μm

Pd = 150 μm
Dw = 30 μm

Pd = 50 μm
Dw = 10 μm

Pd = 100 μm
Dw = 10 μm

Pd=DIAMETER=100μm

Pd=50μm
Dw=24μm

Pd= 100 μm
Dw= 20 μm

Pd= 100 μm
Dw= 10 μm

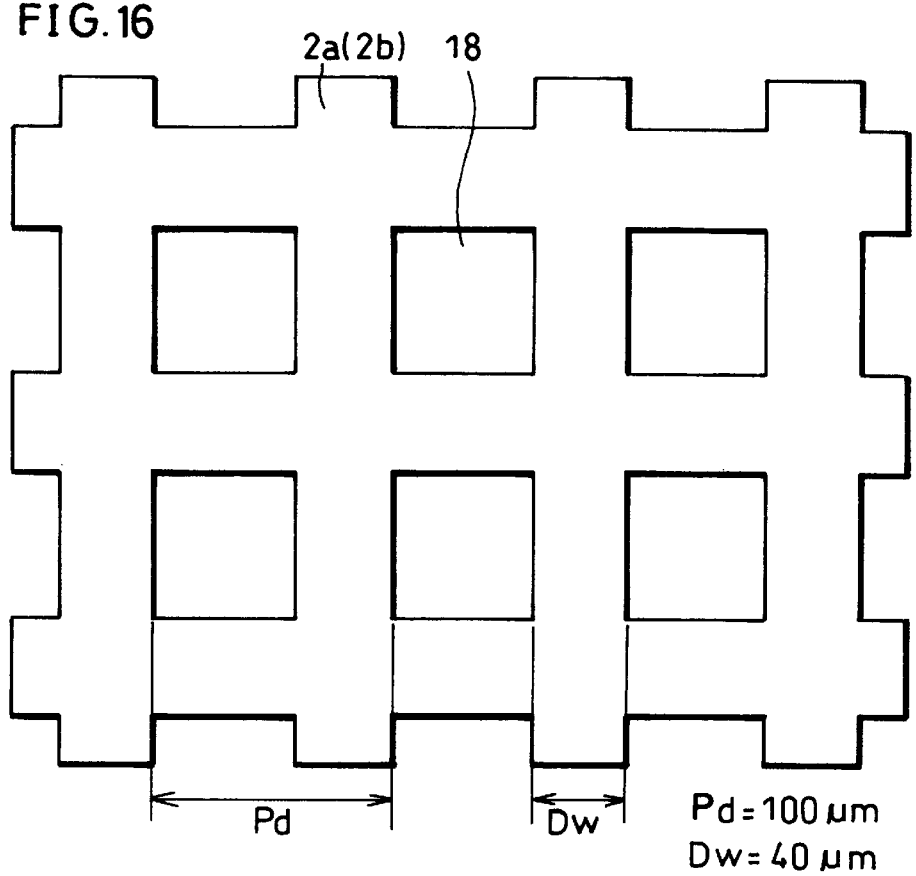
FIG.16    2a(2b)    18
Pd=100 μm
Dw=40 μm
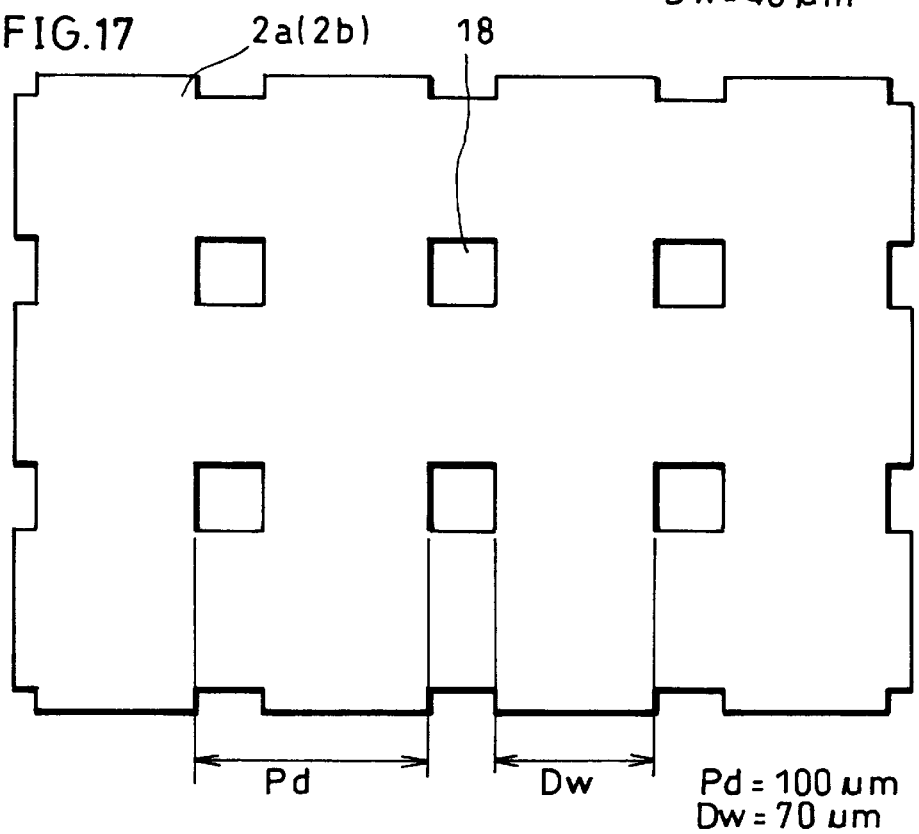
FIG.17    2a(2b)    18
Pd=100 μm
Dw=70 μm Pd = 150 μm
Dw = 30 μm Pd = 50 μm
Dw = 10 μm Pd = 100 μm
Dw = 10 μm

EQUILATERAL TRIANGLE

Pd=100μm
Dw=5μm

TOUCH PANEL

FIELD OF THE INVENTION

The present invention concerns a touch panel for mounting on a display device, and, in particular, concerns a touch panel for use in portable information terminals, computers, etc.

BACKGROUND OF THE INVENTION

Among the types of touch panels are pressure-sensitive, capacitance-detecting, and magnetic-detecting touch panels. Touch panels of the pressure-sensitive type are widely used for mounting on display devices of portable information terminals, etc., because they have a simple circuit structure, do not require a special input pen, have a low power consumption, etc.

Further, among pressure-sensitive touch panels, the analog method, which uses a resistance film, is generally used, because a higher resolution can be obtained than with the digital method, which uses a membrane switch.

A touch panel is mounted on a liquid crystal display device which is the display device of a portable information terminal, thus enabling simultaneous input and display on the display screen.

For the liquid crystal display device which is the display device of a portable information terminal, a reflective-type liquid crystal display device is generally used, because it does not require a backlight, has a low power consumption, is thin and light-weight, etc.

Here, the state of light when a touch panel is mounted on a reflective-type liquid crystal display device will be explained using FIG. 23. FIG. 23 is a cross-sectional view explaining the state of light when a touch panel is mounted on a reflective-type liquid crystal device.

Since, as shown in FIG. 23, a touch panel 51 is mounted on a reflective-type liquid crystal display device 52, incoming light 53 reaches the reflective-type liquid crystal display device 52 after passing through the touch panel 51. Then, the incoming light 53 is reflected off a reflective substrate 54 of the reflective-type liquid crystal display device 52, and, after passing through the touch panel 51, reaches the user as outgoing light 55.

In other words, since the light passes through the touch panel 51 twice, the amount of light of the outgoing light 55 is the amount of light of the incoming light 53 multiplied by the square of the light transmittance of the touch panel 51. Thus the brightness of the reflective-type liquid crystal display device 52 is less than that of a device not provided with the touch panel 52.

One possible cause of this kind of reduction of the light transmittance by the touch panel is reflection at the interface between the touch panel's transparent conductive film and the layer of air between the touch panel's two insulating substrates.

This reflection at the interface between the transparent conductive film and the layer of air between the two insulating substrates is based on the loss of the amount of light accompanying reflection as the light passes through the interface between two media with different refractive indices. If the refractive index of the outer medium is $n_1$ and that of the adjacent inner medium is $n_2$, then the light transmittance T and reflection R of the interface will be as shown by the following equations.

Light transmittance $T = 4n_1 n_2 / (n_1 + n_2)^2$

Reflection $R = ((n_1 - n_2)/(n_1 + n_2))^2$

Note, with regard to the reflection R, that the larger the difference $(n_1 - n_2)$ between $n_1$ and $n_2$, the larger the reflection R becomes, resulting in reduction of the light transmittance T and a darker display screen.

A method of solving this kind of problem by providing an anti-reflective film on the surface of the touch panel's transparent conductive film has been disclosed in Unexamined Japanese Patent Publication No. 8-195138/1996.

However, a drawback of the method disclosed in Unexamined Japanese Patent Publication No. 8-195138/1996 is that, since the entire surface of the transparent conductive film is provided with the anti-reflective film, the contact resistance between the two transparent conductive films is increased, and the touch panel's input sensitivity is impaired.

The touch panel's circuit design can compensate for this problem, but this entails development of a new circuit, which requires a great amount of time and incurs development expenses.

SUMMARY OF THE INVENTION

In light of the foregoing problems, the object of the present invention is to provide a touch panel which enables a bright display screen when mounted on a display device, but without impairing the input sensitivity of the touch panel.

In order to attain the foregoing object, a touch panel according to the present invention has a structure in which anti-reflective films are selectively provided on at least one of the transparent conductive films.

With the foregoing structure, some areas of the transparent conductive film are provided with anti-reflective films, and other areas thereof are not so provided. The former areas serve the customary function of an anti-reflective film, and the latter areas serve the customary function of a transparent conductive film not provided with an anti-reflective film.

In other words, since the anti-reflective films selectively provided on the transparent conductive film prevent reflection at the interface between the transparent conductive film and the layer of air between the two insulating substrates, the display screen can be made brighter. The areas not provided with the anti-reflective films, on the other hand, sense input to the touch panel. The anti-reflective films do not cover the entire surface of the transparent conductive film, as is the case with conventional structures. Thus the contact resistance between the two transparent conductive films is not increased, and the input sensitivity of the touch panel is not impaired.

In order to attain the object mentioned above, another touch panel according to the present invention has a structure in which selected portions of at least one transparent conductive film are not provided with transparent conductive film (i.e., holes are selectively provided in the transparent conductive film).

With the foregoing structure, there are areas where the transparent conductive film is provided, and other areas where it is not. Where the holes are provided in the transparent conductive film, light transmittance is improved by the absence of the transparent conductive film, making the display screen brighter. In addition, since anti-reflective films need not be provided on the transparent conductive film, the contact resistance between the two transparent conductive films is not increased, and the input sensitivity of the touch panel is not impaired.

BRIEF DESCRIPTION OF THE DRAWINGS

FIG. 16 is an explanatory drawing showing a third arrangement of holes in a transparent conductive film according to the present invention.

FIG. 17 is an explanatory drawing showing a fourth arrangement of holes in a transparent conductive film according to the present invention.

DESCRIPTION OF THE EMBODIMENTS

The following will explain the first through fourth embodiments of the present invention with reference to FIGS. 1 through 11.

Figure 1:
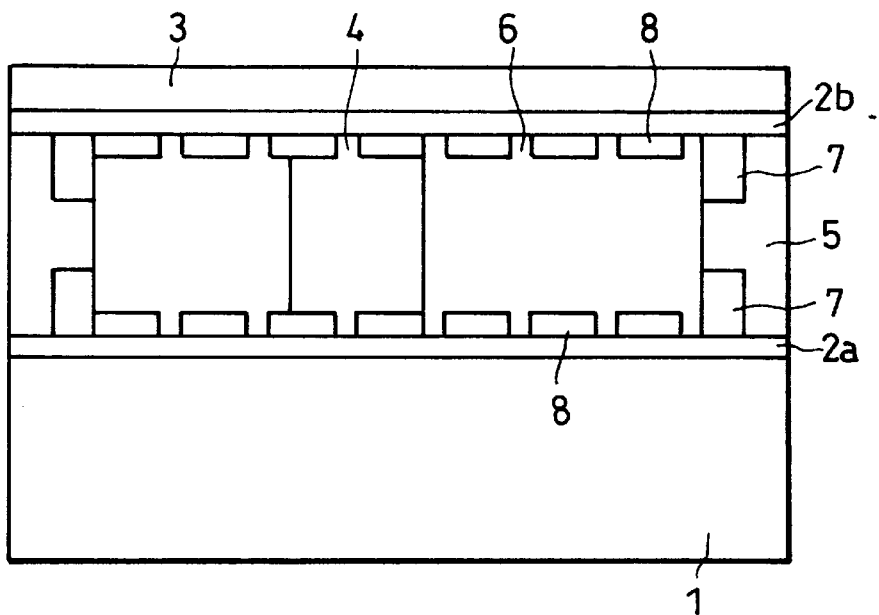
FIG. 1 is a cross-sectional view showing a touch panel according to the present invention.

The first embodiment of the present invention will be explained with reference to FIGS. 1 through 3. FIG. 1 is a cross-sectional view showing a touch panel according to the present invention, FIG. 2 is a plan view showing the touch panel shown in FIG. 1, and FIG. 3 is an explanatory drawing showing a first arrangement of anti-reflective films according to the present invention.

Figure 2:
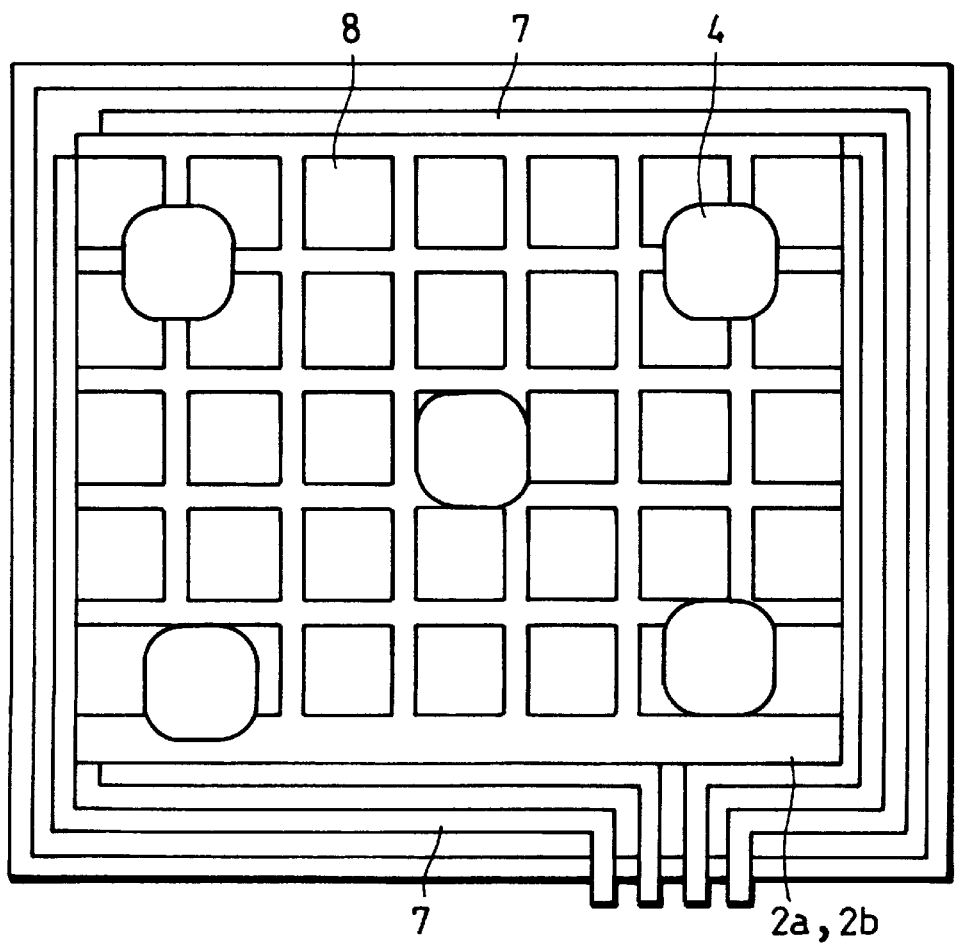
FIG. 2 is a plan view showing the touch panel shown in FIG. 1.
Figure 3:
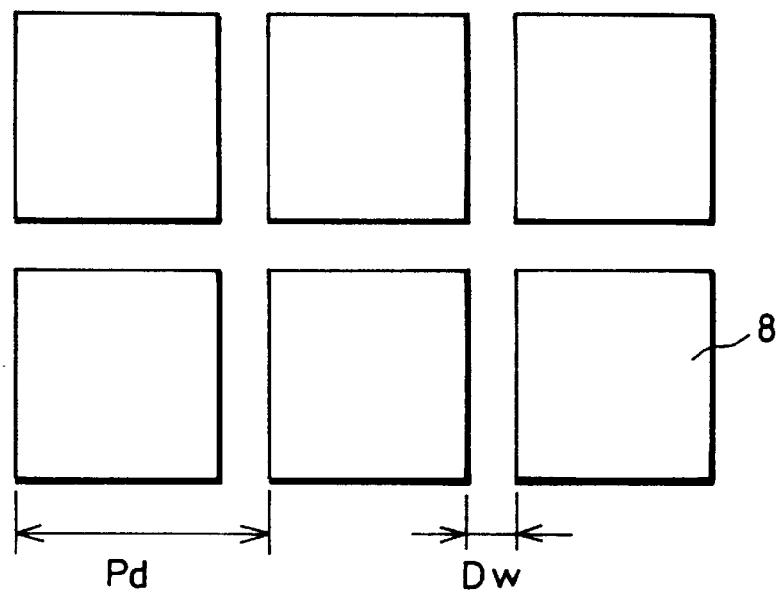
FIG. 3 is an explanatory drawing showing a first arrangement of anti-reflective films according to the present invention.

As shown in FIGS. 1 and 2, this touch panel is made up of (a) an insulating substrate 1 made of glass (refractive index 1.52) of 0.7 mm thickness, on which is provided a transparent conductive film 2a made of ITO (refractive index 1.90) of 30 nm thickness, and (b) a flexible insulating substrate 3 made of a polymeric film such as polyethylene terephthalate (refractive index 1.60), on which is provided a transparent conductive film 2b made of ITO (refractive index 1.90) of 30 nm thickness. A double-sided adhesive tape 5 combines together the above-mentioned (a) and (b), between which is provided a spacer 4 made of epoxy resin, etc. of 10 μm thickness, formed, for example, by screen printing.

Since the insulating substrate 1 and the flexible insulating substrate 3 are held 10 μm apart by the spacer 4, there is an air layer 6 (refractive index 1.00) of 10 μm thickness between the insulating substrate 1 and the flexible insulating substrate 3.

The insulating substrate 1 and the flexible insulating substrate 3 are also provided with collecting electrodes 7 made of silver, etc. and formed, for example, by screen printing.

On the transparent insulating films 2a and 2b, anti-reflective films 8 are provided by, for example, offset printing, in the form, shown in FIG. 3, of square islets 100 nm thick, each with a pitch Pd of 100 μm, an interval Dw of 20 μm, and sides of 80 μm (hereinafter this arrangement of the anti-reflective films 8 will be referred to as the "first arrangement").

The provision of the anti-reflective films 8 is not limited to any particular method, but may be performed by offset printing, ink-jet printing, spraying, photo-lithography, etc.

For the present embodiment, three touch panels were prepared: (i) one using an insulating film with a refractive index of 1.41 (Tokyo Applied Chemical MOF PCF-100 No. 64-2) for the anti-reflective films 8; (ii) one using an insulating film with a refractive index of 1.58 (polyimide) for the anti-reflective films 8; and (iii) one using an insulating film with a refractive index of 1.68 (Tokyo Applied Chemical MOF Ti-Si INK-Film) for the anti-reflective films 8. As a comparative example, a touch panel without the anti-reflective films 8 was also prepared. Then, transmittance of light of 550 nm wavelength (hereinafter referred to as "light transmittance," omitting the wavelength) and luminosity L* were measured for each of these four touch panels.

The results of these measurements are shown in Table 1. Luminosity L* was measured with a Minolta CM-1000, with the touch panel unit placed on a standard white plate.

TABLE 1

| ANTI-REFLECTIVE FILMS | LIGHT TRANSMITTANCE | LUMINOSITY L* |
|---|---|---|
| NO | 79.4% | 86.1 |
| YES (REFRACTIVE INDEX 1.41) | 84.0% | 91.1 |
| YES (REFRACTIVE INDEX 1.58) | 80.8% | 87.6 |
| YES (REFRACTIVE INDEX 1.68) | 80.2% | 86.9 |

As shown in Table 1, the touch panel without the anti-reflective films 8 had light transmittance of 79.4% and luminosity L* of 86.1. In contrast, the touch panel with anti-reflective films having a refractive index of 1.41 had light transmittance of 84.0% and luminosity L* of 91.1; the touch panel with anti-reflective films having a refractive index of 1.58 had light transmittance of 80.8% and luminosity L* of 87.6; and the touch panel with anti-reflective films having a refractive index of 1.68 had light transmittance of 80.2% and luminosity L* of 86.9.

As the foregoing shows, by providing the anti-reflective films 8 in islet form, each of the three touch panels in the present embodiment is able to improve light transmittance and luminosity, and, when mounted on a display device, to realize a bright display screen. In particular, it can be seen that good results are obtained with a touch panel provided with anti-reflective films 8 having a refractive index of 1.41.

Figure 4:
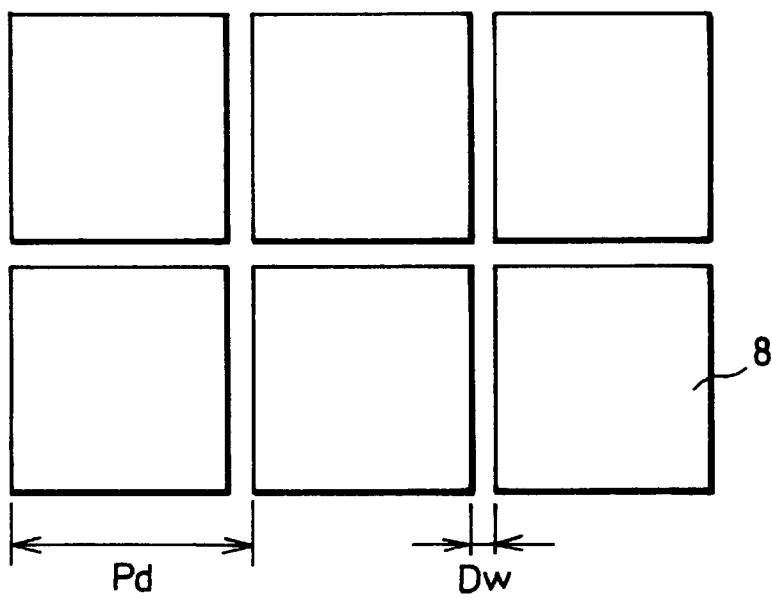
FIG. 4 is an explanatory drawing showing a second arrangement of anti-reflective films according to the present invention.
Figure 5:
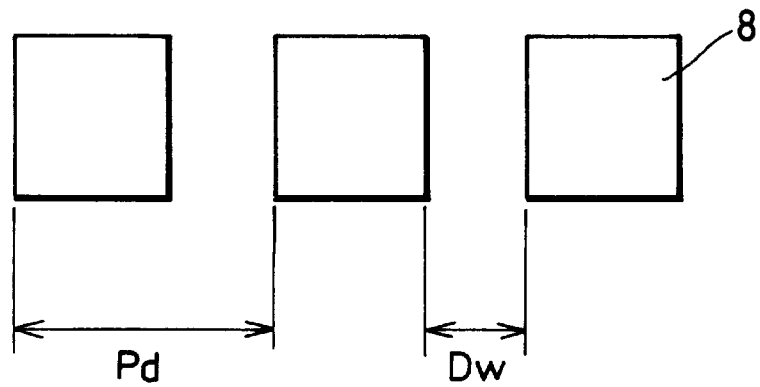
FIG. 5 is an explanatory drawing showing a third arrangement of anti-reflective films according to the present invention.
Figure 6:
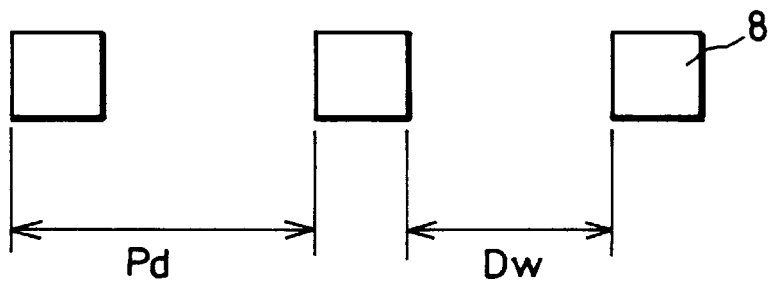
FIG. 6 is an explanatory drawing showing a fourth arrangement of anti-reflective films according to the present invention.

Next, the second embodiment of the present invention will be explained with reference to FIGS. 4 through 6. FIG. 4 is an explanatory drawing showing a second arrangement of the anti-reflective films 8, FIG. 5 is an explanatory drawing showing a third arrangement of the anti-reflective films 8, and FIG. 6 is an explanatory drawing showing a fourth arrangement of the anti-reflective films 8.

In the present embodiment, a touch panel was prepared with the same structure as that of the first embodiment, except for the anti-reflective films 8. In the present embodiment, just as in the first embodiment, the anti-reflective films 8 were provided in the form of square islets of 100 nm thickness, using an insulating film with a refractive index of 1.41 (Tokyo Applied Chemical MOF PCF-100 No. 64-2).

For the present embodiment, touch panels with three arrangements of the anti-reflective films 8 were prepared: (i) one with the arrangement shown in FIG. 4, of square islets each with a pitch Pd of 100 μm, an interval Dw of 10 μm, and sides of 90 μm (this arrangement hereinafter referred to as the "second arrangement"); (ii) one with the arrangement shown in FIG. 5, of square islets each with a pitch Pd of 100 μm, an interval Dw of 40 μm, and sides of 60 μm (this arrangement hereinafter referred to as the "third arrangement"); and (iii) one with the arrangement shown in FIG. 6, of square islets each with a pitch Pd of loom, an interval Dw of 70 μm, and sides of 30 μm (this arrangement hereinafter referred to as the "fourth arrangement"). Then, light transmittance and luminosity L* were measured for each of these three touch panels, and for the touch panel with the first arrangement of the anti-reflective films 8 according to the first embodiment.

The results of these measurements are shown in Table 2. Luminosity L* was measured with a Minolta CM-1000, with the touch panel unit placed on a standard white plate.

Further, Table 2 also shows the results of evaluation of the input sensitivity of each of the four touch panels when it was mounted on a reflective-type liquid crystal display device. Input sensitivity was evaluated by human perception, with touch panels having good input sensitivity shown by "O" and those having somewhat inferior input sensitivity shown by "Δ".

The reflective-type liquid crystal display device used had a matrix arrangement of square pixels, each with a pitch P of 200 μm, a pixel interval D of 10 μm, and sides of 190 μm. The percentage of the area of each pixel occupied by the anti-reflective films 8 (hereinafter referred to as "Area Percentage") is also shown in Table 2.

TABLE 2

| ANTI-REFLECTIVE FILMS | LIGHT TRANSMITTANCE | LUMINOSITY L* | INPUT SENSITIVITY | AREA PERCENTAGE |
|---|---|---|---|---|
| FIRST ARRANGEMENT | 84.0% | 91.1 | O | 71% |
| SECOND ARRANGEMENT | 85.2% | 92.5 | Δ | 90% |
| THIRD ARRANGEMENT | 80.6% | 87.4 | O | 40% |
| FOURTH ARRANGEMENT | 80.0% | 86.8 | O | 10% |

As shown in Table 2, the touch panel with the first arrangement of the anti-reflective films 8 had light transmittance of 84.0%, luminosity L* of 91.1, good input sensitivity, and an Area Percentage of 71%. The touch panel with the second arrangement of the anti-reflective films 8 had light transmittance of 85.2%, luminosity L* of 92.5, somewhat inferior input sensitivity, and an Area Percentage of 90%. The touch panel with the third arrangement of the anti-reflective films 8 had light transmittance of 80.6%, luminosity L* of 87.4, good input sensitivity, and an Area Percentage of 40%. The touch panel with the fourth arrangement of the anti-reflective films 8 had light transmittance of 80.0%, luminosity L* of 86.8, good input sensitivity, and an Area Percentage of 10%.

As the foregoing shows, when the Area Percentage is 90% or more, the input sensitivity is somewhat inferior, and when the Area Percentage is 10% or less, the display screen brightness is insufficiently improved.

Accordingly, if an Area Percentage of 10% or more but less than 90% is chosen, good input sensitivity and a bright display screen can both be obtained. Within this Area Percentage range, the Area Percentage can be reduced in order to give precedence to input sensitivity, or increased in order to give precedence to display screen brightness.

Figure 7:
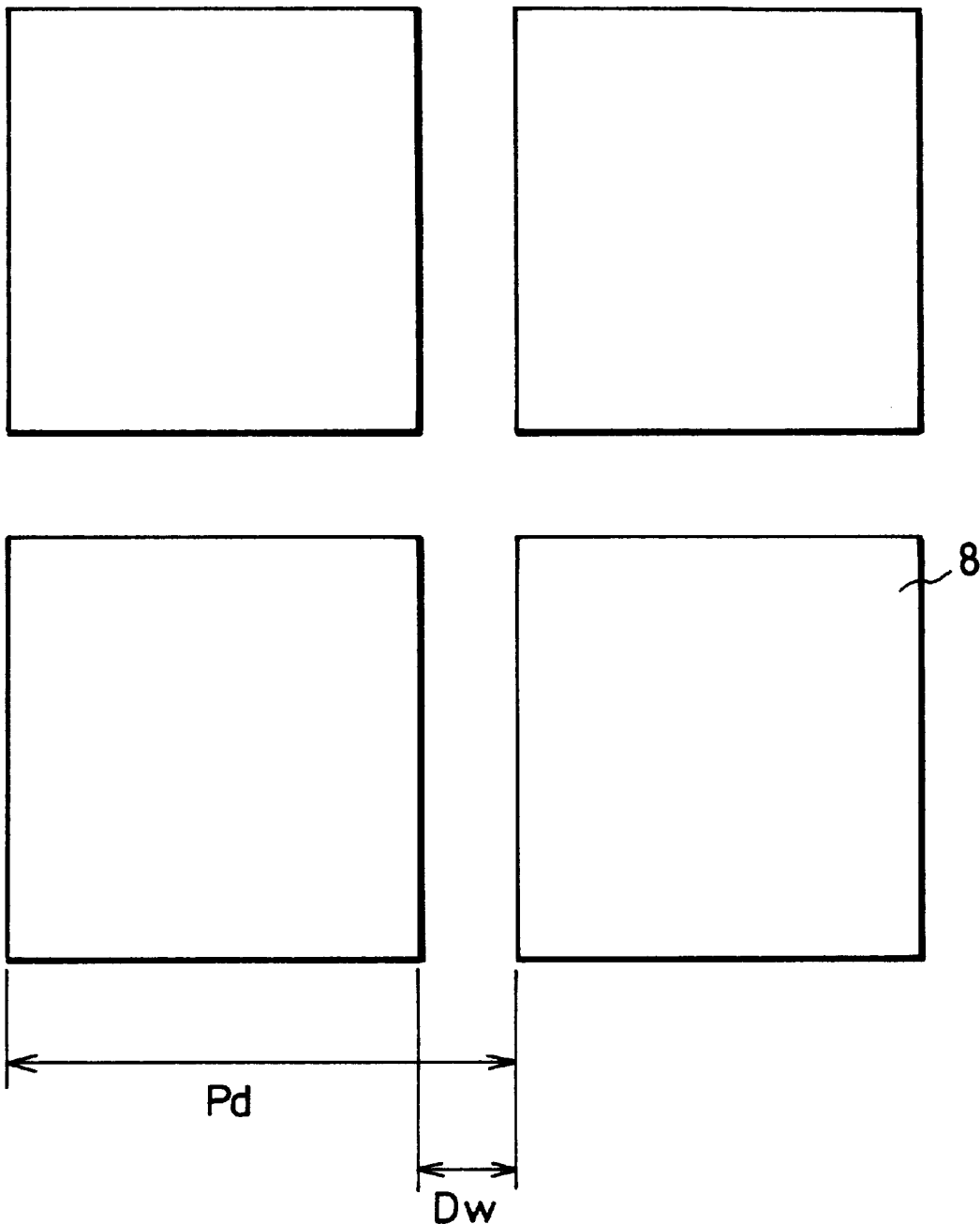
FIG. 7 is an explanatory drawing showing a fifth arrangement of anti-reflective films according to the present invention.
Figure 8:
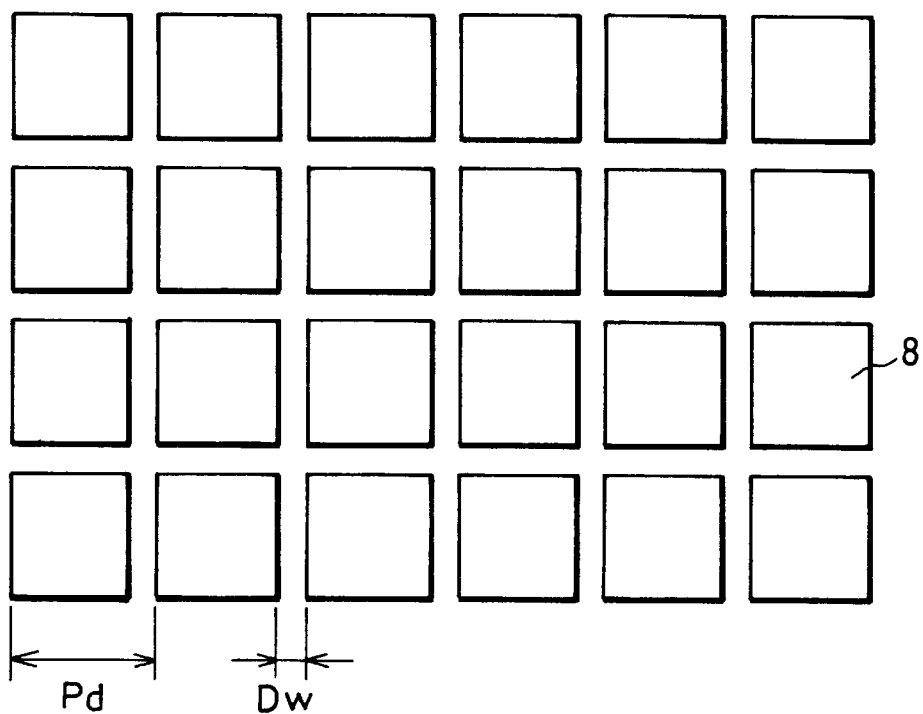
FIG. 8 is an explanatory drawing showing a sixth arrangement of anti-reflective films according to the present invention.

Next, the third embodiment of the present invention will be explained with reference to FIGS. 7 and 8. FIG. 7 is an explanatory drawing showing a fifth arrangement for the anti-reflective films 8, and FIG. 8 is an explanatory drawing showing a sixth arrangement for the anti-reflective films 8.

In the present embodiment, a touch panel was prepared with the same structure as that of the first embodiment, except for the anti-reflective films 8. In the present embodiment, just as in the first embodiment, the anti-reflective films 8 were provided in the form of square islets of 100 nm thickness, using an insulating film with a refractive index of 1.41 (Tokyo Applied Chemical MOF PCF-100 No. 64-2).

For the present embodiment, touch panels with two arrangements of the anti-reflective films 8 were prepared: (i) one with the arrangement shown in FIG. 7, of square islets each with a pitch Pd of 150 μm, an interval Dw of 30 μm, and sides of 120 μm (this arrangement hereinafter referred to as the "fifth arrangement"); and (ii) one with the arrangement shown in FIG. 8, of square islets each with a pitch Pd of 50 μm, an interval Dw of 10 μm, and sides of 40 μm (this arrangement hereinafter referred to as the "sixth arrangement"). Then, input sensitivity and uniformity of input sensitivity by pixel were evaluated for each of these two touch panels, and for the touch panel with the first arrangement of the anti-reflective films 8 according to the first embodiment, when they were mounted on a reflective-type liquid crystal display device. Table 3 shows the results of these evaluations.

Input sensitivity was evaluated by human perception, with touch panels having good input sensitivity shown by "O" and those having somewhat inferior input sensitivity shown by "Δ". Uniformity of input sensitivity was also evaluated by human perception, with good uniformity of input sensitivity shown by "O" and somewhat inferior uniformity of input sensitivity shown by "Δ".

The reflective-type liquid crystal display device used had a matrix arrangement of square pixels, each with a pitch P of 200 μm, a pixel interval D of 10 μm, and sides of 190 μm.

Setting the pitch Pd of the anti-reflective films 8 at (1/n) with respect to the pitch P of the display device pixels can equalize the input sensitivity for each pixel by ensuring that the area and shape occupied by the anti-reflective films 8 is the same for each pixel.

Figure 9:
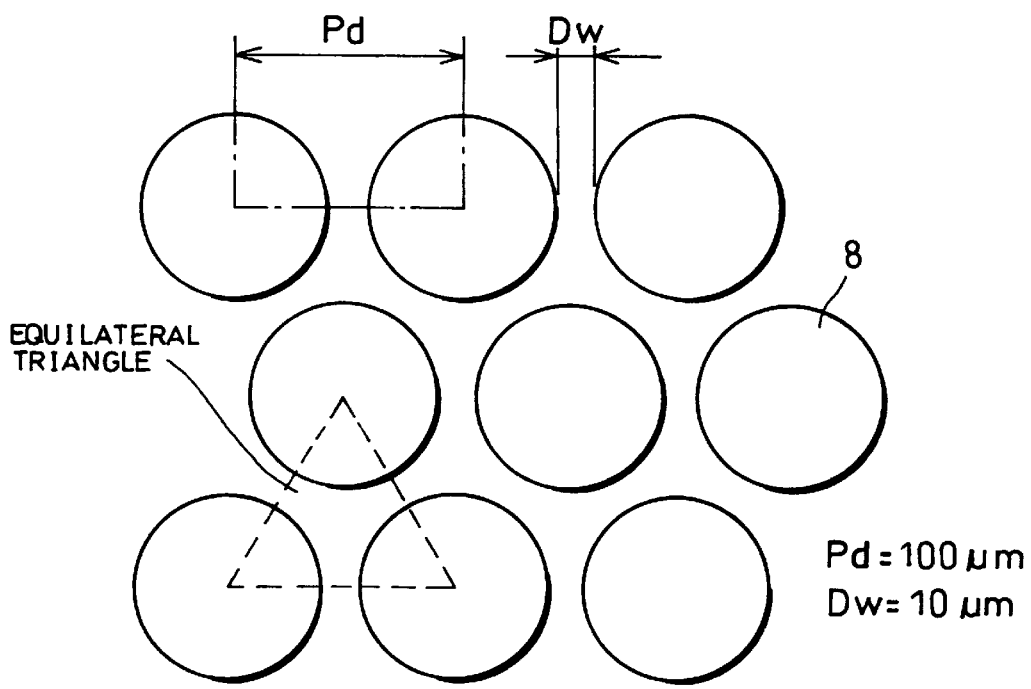
FIG. 9 is an explanatory drawing showing a seventh arrangement of anti-reflective films according to the present invention.
Figure 10:
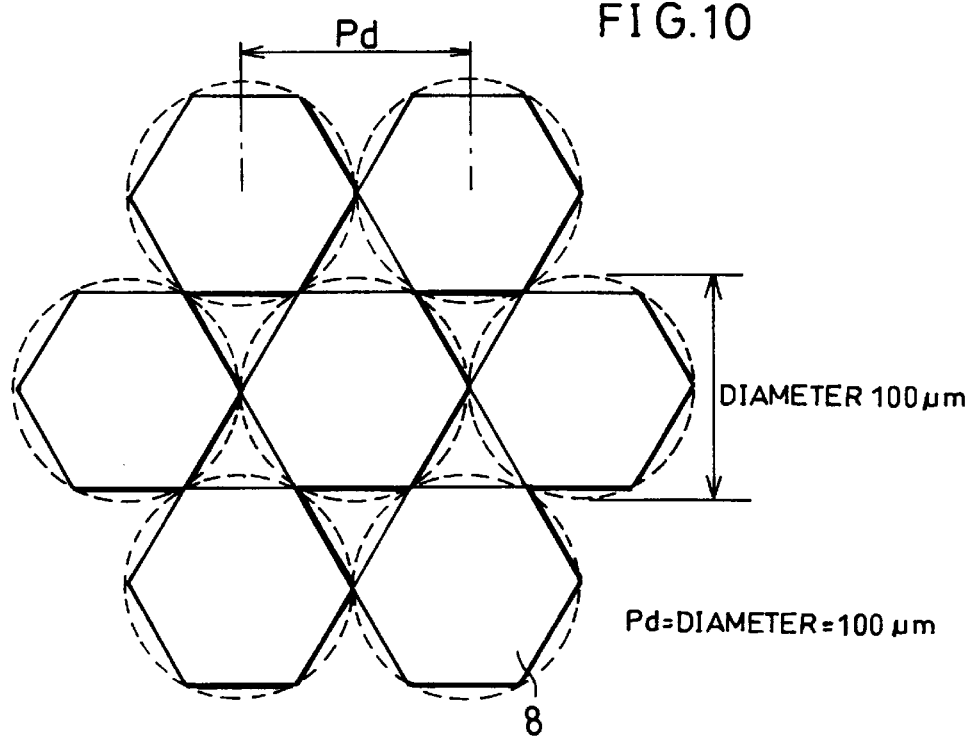
FIG. 10 is an explanatory drawing showing an eighth arrangement of anti-reflective films according to the present invention.
Figure 11:
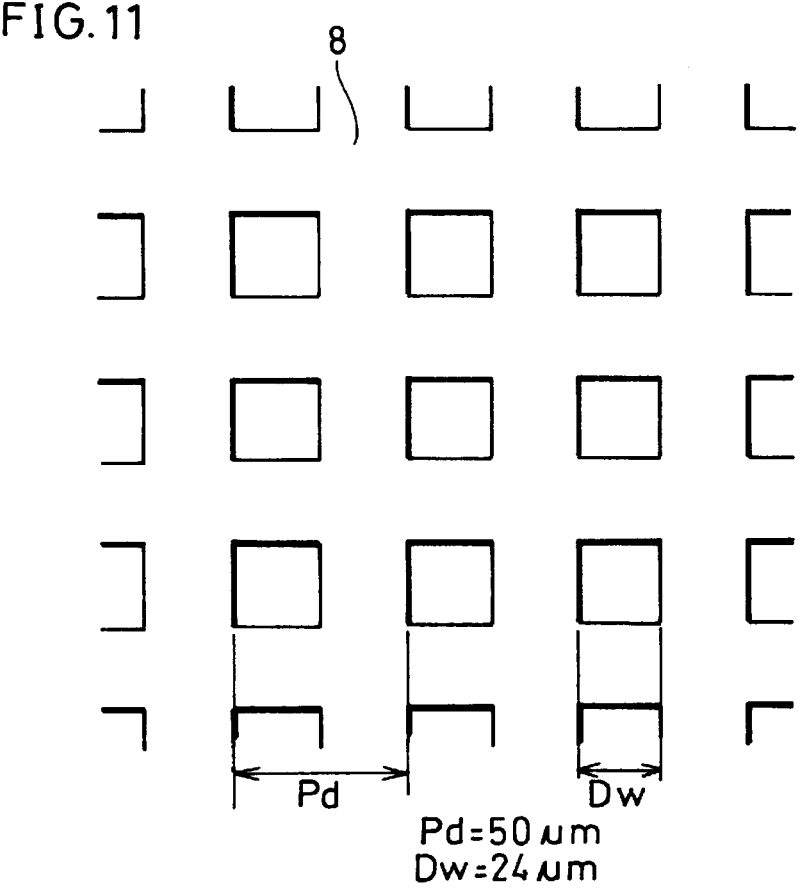
FIG. 11 is an explanatory drawing showing a ninth arrangement of anti-reflective films according to the present invention.

Next, the fourth embodiment of the present invention will be explained with reference to FIGS. 9 through 11. FIG. 9 is an explanatory drawing showing a seventh arrangement for the anti-reflective films 8, FIG. 10 is an explanatory drawing showing an eighth arrangement for the anti-reflective films 8, and FIG. 11 is an explanatory drawing showing a ninth arrangement for the anti-reflective films 8.

In the present embodiment, a touch panel was prepared with the same structure as that of the first embodiment, except for the anti-reflective films 8. In the present embodiment, the anti-reflective films 8 were provided, except for form and arrangement, as in the first embodiment, i.e., using an insulating film with a refractive index of 1.41 (Tokyo Applied Chemical MOF PCF-100 No. 64-2) of 100 nm thickness.

For the present embodiment, touch panels with three arrangements of the anti-reflective films 8 were prepared: (i) one with the arrangement shown in FIG. 9, of circular islets centered on the points of equilateral triangles with sides of 100 μm, each islet having a diameter of 90 μm, a pitch Pd of 100 μm and an interval Dw of 10 μm (this arrangement hereinafter referred to as the "seventh arrangement") ; (ii) one with the arrangement shown in FIG. 10, of regular hexagonal islets inscribed within circles 100 μm in diameter, each islet having a pitch Pd of 100 μm (this arrangement hereinafter referred to as the "eighth arrangement"); and (iii) one with the arrangement shown in FIG. 11, of a lattice with pitches Pd of 50 μm, and intervals (openings) 26 μm square (this arrangement hereinafter referred to as the "ninth arrangement"). Then, light transmittance and luminosity L* were measured for each of these three touch panels.

The results of these measurements are shown in Table 4. Luminosity L* was measured with a Minolta CM-1000, with the touch panel unit placed on a standard white plate.

TABLE 3

| ANTI-REFLECTIVE FILMS | INPUT SENSITIVITY | UNIFORMITY OF INPUT SENSITIVITY |
| --- | --- | --- |
| FIRST ARRANGEMENT | O | O |
| FIFTH ARRANGEMENT | O | Δ |
| SIXTH ARRANGEMENT | O | O |

As shown in Table 3, the touch panel with the first arrangement of the anti-reflective films 8 had good input sensitivity and uniformity of input sensitivity. The touch panel with the fifth arrangement had good input sensitivity, but uniformity of input sensitivity was somewhat inferior. The touch panel with the sixth arrangement had good input sensitivity and uniformity of input sensitivity.

In this way, uniformity of input sensitivity can be improved by setting the pitch Pd of the anti-reflective films 8 at (1/n) with respect to the pitch P of the display device pixels, where n is an integer 1 or greater.

For example, in the case of the first arrangement, the pitch Pd (=100 μm) of the anti-reflective films 8 is (½) of the pitch P (=200 μm) of the display device pixels, and in the case of the sixth arrangement, the pitch Pd (=50 μm) of the anti-reflective films 8 is (¼) of the pitch P (=200 μm) of the display device pixels. In contrast, in the case of the fifth arrangement, the pitch Pd (=150 μm) of the anti-reflective films 8 is (¾) of the pitch P (=200 μm) of the display device pixels, and is thus not (1/integer).

Further, Table 4 shows the results of evaluation of each touch panel's input sensitivity and uniformity of input sensitivity when it was mounted on a reflective-type liquid crystal display device.

Input sensitivity was evaluated by human perception, with touch panels having good input sensitivity shown by "O" and those having somewhat inferior input sensitivity shown by "Δ". Uniformity of input sensitivity was also evaluated by human perception, with good uniformity of input sensitivity shown by "O" and somewhat inferior uniformity of input sensitivity shown by "Δ".

The reflective-type liquid crystal display device used had a matrix arrangement of square pixels, each with a pitch P of 200 μm, a pixel interval D of 10 μm, and sides of 190 μm.

TABLE 4

| ANTI-REFLECTIVE FILMS | LIGHT TRANSMITTANCE | LUMINOSITY L* | INPUT SENSITIVITY | UNIFORMITY OF INPUT SENSITIVITY |
|---|---|---|---|---|
| SEVENTH ARRANGEMENT | 84.7% | 91.9 | ◯ | ◯ |
| EIGHTH ARRANGEMENT | 84.8% | 92.0 | ◯ | ◯ |
| NINTH ARRANGEMENT | 84.9% | 92.1 | ◯ | ◯ |

As shown in Table 4, the touch panel with the seventh arrangement of the anti-reflective films 8 had light transmittance of 84.7%, luminosity L* of 91.9, and good input sensitivity and uniformity of input sensitivity. The touch panel with the eighth arrangement of the anti-reflective films 8 had light transmittance of 84.8%, luminosity L* of 92.0, and good input sensitivity and uniformity of input sensitivity. The touch panel with the ninth arrangement of the anti-reflective films 8 had light transmittance of 84.9%, luminosity L* of 92.1, and good input sensitivity and uniformity of input sensitivity.

As the foregoing shows, good input sensitivity and a bright display screen can both be obtained even with anti-reflective films 8 of other than square shape. Further, uniformity of input sensitivity can be improved by setting the pitch Pd of the anti-reflective films 8 at (1/n) with respect to the pitch P of the display device pixels, where n is an integer 1 or greater.

Accordingly, the islet shape of the anti-reflective films 8 need not be limited to square, and the same results can be obtained with circular, oval, or polygonal islets. Again, the shape of the anti-reflective films 8 may also be in the form of a lattice.

Each of the foregoing embodiments used anti-reflective films 8 of the same thickness, but there is no need to be limited to this. Any thickness may be used which enables both a bright display screen and good input sensitivity. The material of the anti-reflective films 8 also need not be limited to that used in the embodiments discussed above.

In short, it is sufficient if the anti-reflective films 8 satisfy the relation nd =λ/4, where λ is the wavelength (nm) of visible light, n is the refractive index of the material of which the anti-reflective films are made, and d is the film thickness (nm). It is preferable if the wavelength λ is within the range of visible light from 500 (nm) to 600 (nm), more preferably near 550 (nm), the median value of this range. For example, as the following table shows, when a material with a refractive index of 1.3 to 1.5 is used, anti-reflective films having a thickness within a range from 90 (nm) to 110 (nm) are preferable.

| λ | λ/4 (nm) | REFRACTIVE INDEX n | FILM THICKNESS d (nm) |
|---|---|---|---|
| 530 | 132.5 | 1.3 | 102 |
| 530 | 132.5 | 1.4 | 95 |
| 530 | 132.5 | 1.5 | 88 |
| 540 | 135.0 | 1.3 | 104 |
| 540 | 135.0 | 1.4 | 96 |
| 540 | 135.0 | 1.5 | 90 |
| 550 | 137.5 | 1.3 | 106 |
| 550 | 137.5 | 1.4 | 98 |
| 550 | 137.5 | 1.5 | 92 |
| 560 | 140.0 | 1.3 | 108 |
| 560 | 140.0 | 1.4 | 100 |
| 560 | 140.0 | 1.5 | 93 |
| 570 | 142.5 | 1.3 | 110 |
| 570 | 142.5 | 1.4 | 102 |
| 570 | 142.5 | 1.5 | 95 |

Further, each of the foregoing embodiments provided the anti-reflective films 8 on both of the transparent conductive films 2a and 2b, but the same effect may be obtained by providing the anti-reflective films 8 on only one of the transparent conductive films 2a or 2b.

As discussed above, a touch panel according to the invention is a touch panel to be mounted on a device and used as the input device thereof, and up of a pair of insulating substrates, each with a transparent conducting film, with anti-films selectively provided on at least one of parent conducting films.

With the foregoing structure, by providing the anti-reflective films selectively on the transparent conductive film(s), the areas provided with the anti-reflective films make the display screen brighter, and the areas not so provided sense the user's input, thereby avoiding increase of the contact resistance between the two transparent conductive films. Accordingly, impairment of the touch panel's input sensitivity can be avoided even without providing a special circuit.

It is preferable to provide the anti-reflective films in islet or lattice form. In this case, impairment of the touch panel's input sensitivity can be avoided even without providing a special circuit, and the display screen can be made brighter.

It is preferable to set the percentage of the area of each pixel of the display device occupied by the anti-reflective films at 10% or more, but less than 90%. In this case, impairment of the touch panel's input sensitivity can be avoided even without providing a special circuit, the display screen can be made brighter, and each pixel can be given uniform input sensitivity.

It is preferable to set the pitch of the anti-reflective films at (1/n) with respect to the pitch of the pixels, where n is an integer 1 or larger. In this case, impairment of the touch panel's input sensitivity can be avoided even without providing a special circuit, the display screen can be made brighter, and the input sensitivity of each pixel can be made even more uniform.

The following will explain the fifth through ninth embodiments of the present invention with reference to FIGS. 12 through 22. Members having the same functions as those of the first through fourth embodiments above will be given the same reference numerals in what follows.

The following embodiments differ from the first through fourth embodiments above in that the anti-reflective films 8 are not provided on the transparent conductive film, but selected areas of the transparent conductive film are not provided with transparent conductive film (i.e., holes are selectively provided in the transparent conductive film).

Figure 12:
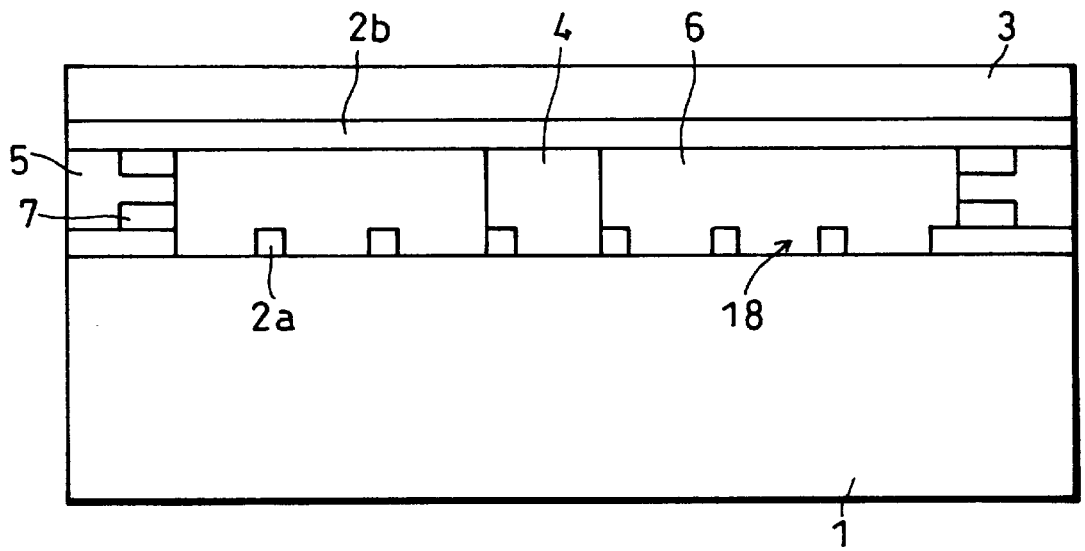
FIG. 12 is a cross-sectional view showing another touch panel according to the present invention.

The fifth embodiment of the present invention will be explained with reference to FIGS. 12 through 14. FIG. 12 is a cross-sectional view showing a touch panel according to the present invention, FIG. 13 is a plan view showing the touch panel shown in FIG. 12, and FIG. 14 is an explanatory drawing showing a first arrangement of holes.

Figure 13:
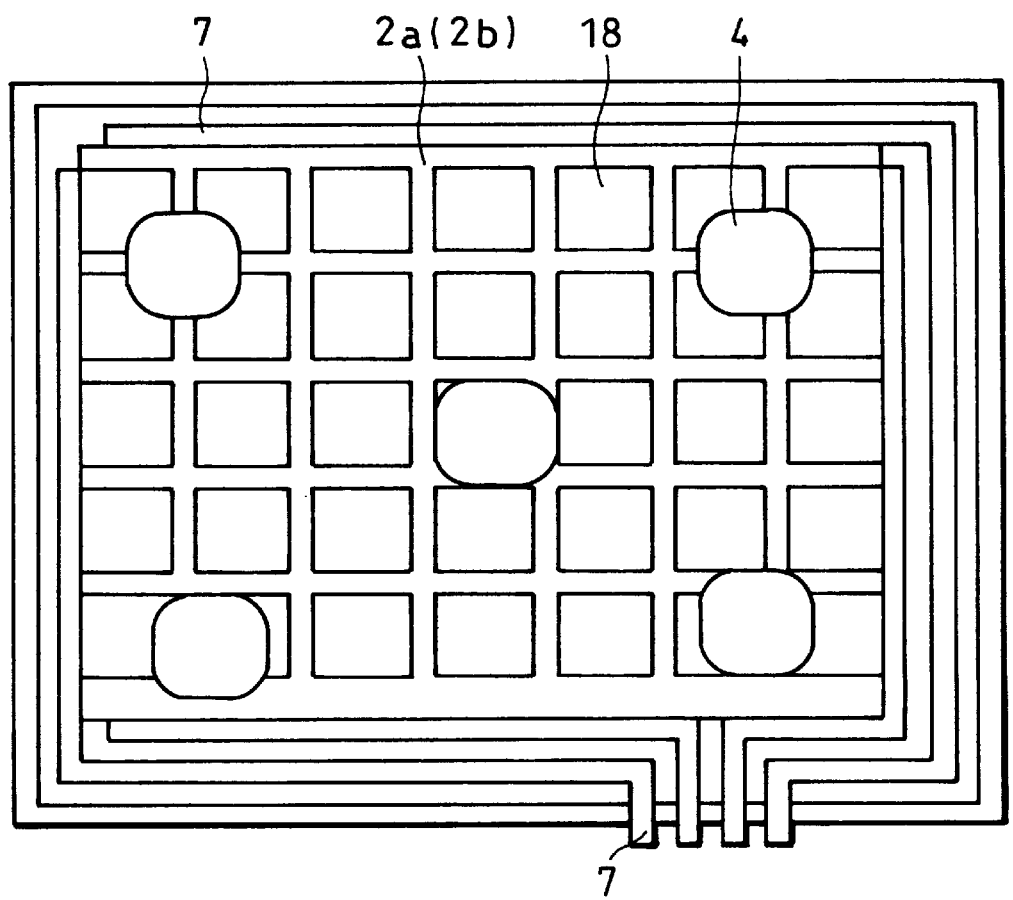
FIG. 13 is a plan view showing the touch panel shown in FIG. 12.
Figure 14:
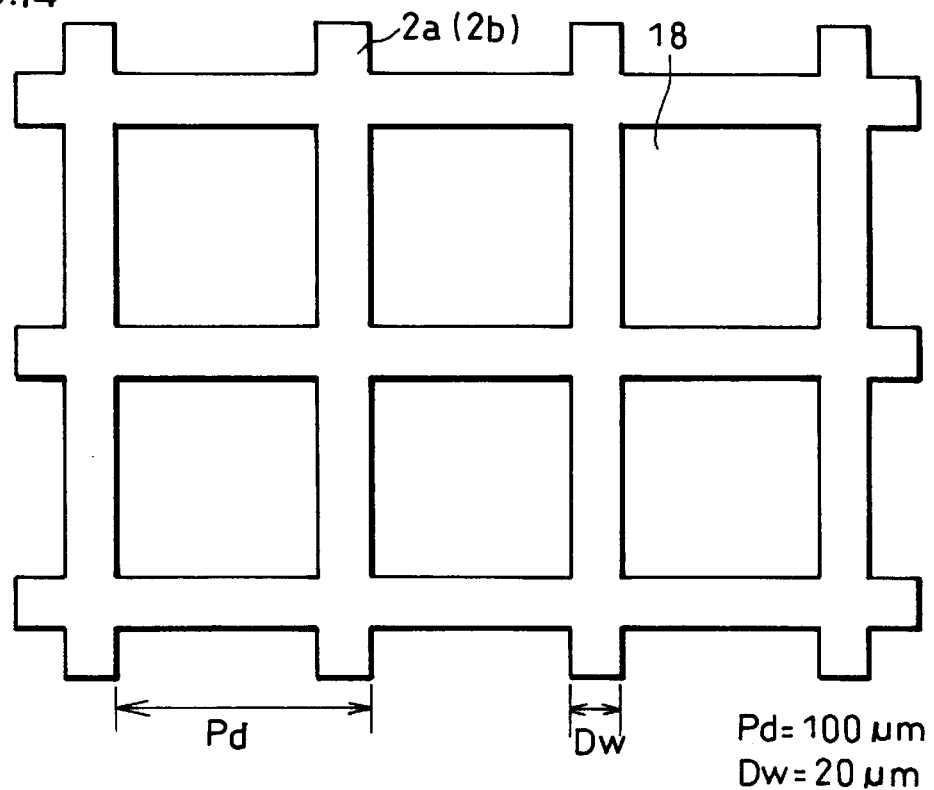
FIG. 14 is an explanatory drawing showing a first arrangement of holes in a transparent conductive film according to the present invention.

As shown in FIGS. 12 and 13, this touch panel is made up of (a) an insulating substrate 1 made of glass (refractive index 1.52) of 0.7 mm thickness, on which is provided a transparent conductive film 2a made of ITO (refractive index 1.90) of 30 nm thickness, and (b) a flexible insulating substrate 3 made of a polymeric film such as polyethylene terephthalate (refractive index 1.60), on which is provided a transparent conductive film 2b made of ITO (refractive index 1.90) of 30 nm thickness. A double-sided adhesive tape 5 combines together the above-mentioned (a) and (b), between which is provided a spacer 4 made of epoxy resin, etc. of 10 μm thickness, formed, for example, by screen printing.

Since the insulating substrate 1 and the flexible insulating substrate 3 are held 10 μm apart by the spacer 4, there is an air layer 6 (refractive index 1.00) of 10 μm thickness between the insulating substrate 1 and the flexible insulating substrate 3. The insulating substrate 1 and the flexible insulating substrate 3 are also provided with collecting electrodes 7 formed of silver, etc. by, for example, screen printing.

The transparent insulating films 2a and 2b are provided with holes 18 by, for example, photo-lithography, in the form shown in FIG. 14, of square holes with a pitch Pd of 100 μm, an interval Dw of 20 μm, and sides of 80 μm (hereinafter this arrangement of the holes 18 will be referred to as the "first arrangement").

The provision of the holes 18 is not limited to any particular method, but may be performed by a combination of photo-lithography and etching, by spraying of etching fluid, etc.

A touch panel provided with the holes 18 as described above was prepared, and, as a comparative example, a touch panel without the holes 18 was also prepared. Then, transmittance of light of 550 nm wavelength (hereinafter referred to as "light transmittance," omitting the wavelength) and luminosity L* were measured for each of these two touch panels.

The results of these measurements are shown in Table 5. Luminosity L* was measured with a Minolta CM-1000, with the touch panel unit placed on a standard white plate.

TABLE 5

|  | WITHOUT HOLES | FIRST ARRANGEMENT OF HOLES |
|---|---|---|
| LIGHT TRANSMITTANCE | 79.4% | 87.3% |
| LUMINOSITY L* | 86.1 | 91.6 |

As shown in Table 5, the touch panel without the holes 18 had light transmittance of 79.4% and luminosity L* of 86.1.

In contrast, the touch panel with the first arrangement of the holes 18 had light transmittance of 87.3% and luminosity L* of 91.6.

As the foregoing shows, the touch panel in the present embodiment, by providing the holes 18 in the first arrangement, is able to improve light transmittance and luminosity, and, when mounted on a display device, to realize a bright display screen.

Figure 15:
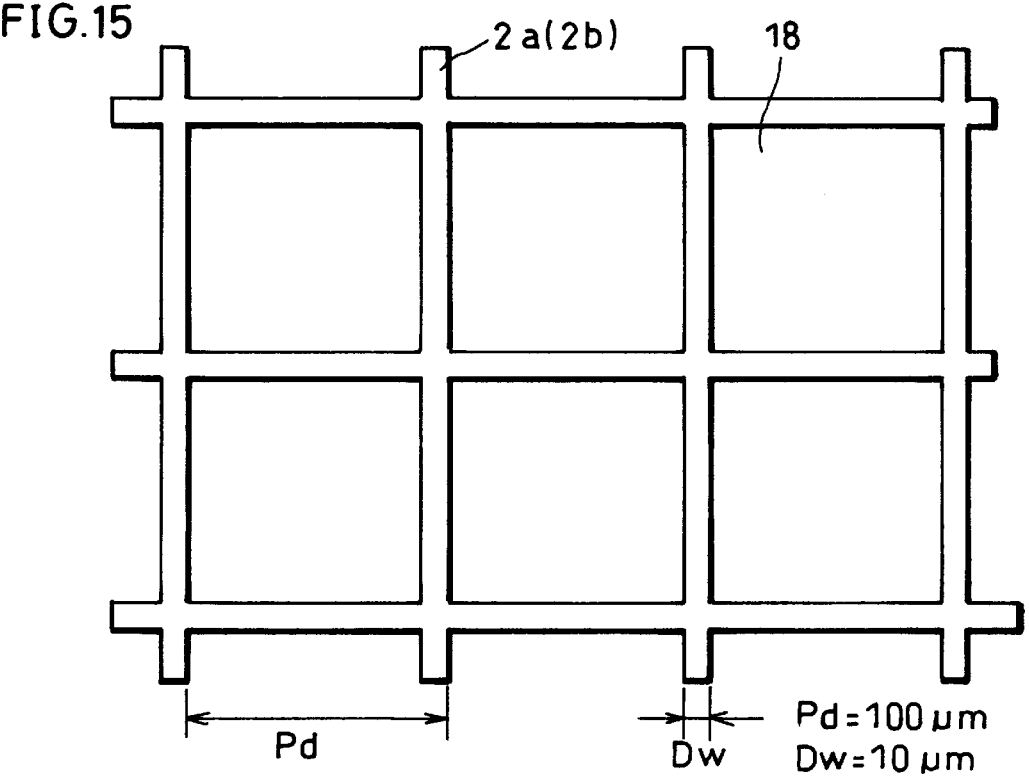
FIG. 15 is an explanatory drawing showing a second arrangement of holes in a transparent conductive film according to the present invention.

Next, the sixth embodiment of the present invention will be explained with reference to FIGS. 15 through 17. FIG. 15 is an explanatory drawing showing a second arrangement of the holes 18, FIG. 16 is an explanatory drawing showing a third arrangement of the holes 18, and FIG. 17 is an explanatory drawing showing a fourth arrangement of the holes 18.

In the present embodiment, a touch panel was prepared with the same structure as that of the fifth embodiment, except for the holes 18.

For the present embodiment, touch panels with three arrangements of the holes 18 were prepared: (i) one with the arrangement shown in FIG. 15, of square holes each with a pitch Pd of 100 μm, an interval Dw of 10 μm, and sides of 90 μm (this arrangement hereinafter referred to as the "second arrangement"); (ii) one with the arrangement shown in FIG. 16, of square holes each with a pitch Pd of 100 μm, an interval Dw of 40 μm, and sides of 60 μm (this arrangement hereinafter referred to as the "third arrangement"); and (iii) one with the arrangement shown in FIG. 17, of square holes each with a pitch Pd of 100 μm, an interval Dw of 70 μm, and sides of 30 μm (this arrangement hereinafter referred to as the "fourth arrangement"). Then, light transmittance and luminosity L* were measured for each of these three touch panels, and for the touch panel with the first arrangement of the holes 18 according to the fifth embodiment.

The results of these measurements are shown in Table 6. Luminosity L* was measured with a Minolta CM-1000, with the touch panel unit placed on a standard white plate.

Further, Table 6 also shows the results of evaluation of the input sensitivity of each of the four touch panels when it was mounted on a reflective-type liquid crystal display device. Input sensitivity was evaluated by human perception, with touch panels having good input sensitivity shown by "O" and those having somewhat inferior input sensitivity shown by "Δ".

The reflective-type liquid crystal display device used had a matrix arrangement of square pixels, each with a pitch P of 200 μm, a pixel interval D of 10 μm, and sides of 190 μm. The percentage of the area of each pixel occupied by the holes 18 (hereinafter referred to as "Area Percentage") is also shown in Table 2.

TABLE 6

| HOLES | LIGHT TRANSMITTANCE | LUMINOSITY L* | INPUT SENSITIVITY | AREA PERCENTAGE |
|---|---|---|---|---|
| FIRST ARRANGEMENT | 87.3% | 91.6 | ○ | 71% |
| SECOND ARRANGEMENT | 89.4% | 93.0 | Δ | 90% |
| THIRD ARRANGEMENT | 83.9% | 89.2 | ○ | 40% |
| FOURTH ARRANGEMENT | 80.5% | 86.9 | ○ | 10% |

As shown in Table 6, the touch panel with the first arrangement of the holes 18 had light transmittance of 87.3%, luminosity L* of 91.6, good input sensitivity, and an Area Percentage of 71%. The touch panel with the second arrangement of the holes 18 had light transmittance of 89.4%, luminosity L* of 93.0, somewhat inferior input sensitivity, and an Area Percentage of 90%. The touch panel with the third arrangement of the holes 18 had light transmittance of 83.9%, luminosity L* of 89.2, good input sensitivity, and an Area Percentage of 40%. The touch panel with the fourth arrangement of the holes 18 had light transmittance of 80.5%, luminosity L* of 86.9, good input sensitivity, and an Area Percentage of 10%.

As the foregoing shows, when the Area Percentage is 90% or more, the input sensitivity is somewhat inferior, and when the Area Percentage is 10% or less, the display screen brightness is insufficiently improved.

Accordingly, if an Area Percentage 10% or more but less than 90% is chosen, good input sensitivity and display screen brightness can both be obtained. Within this Area Percentage range, the Area Percentage can be reduced in order to give precedence to input sensitivity, or increased in order to give precedence to display screen brightness.

Figure 18:
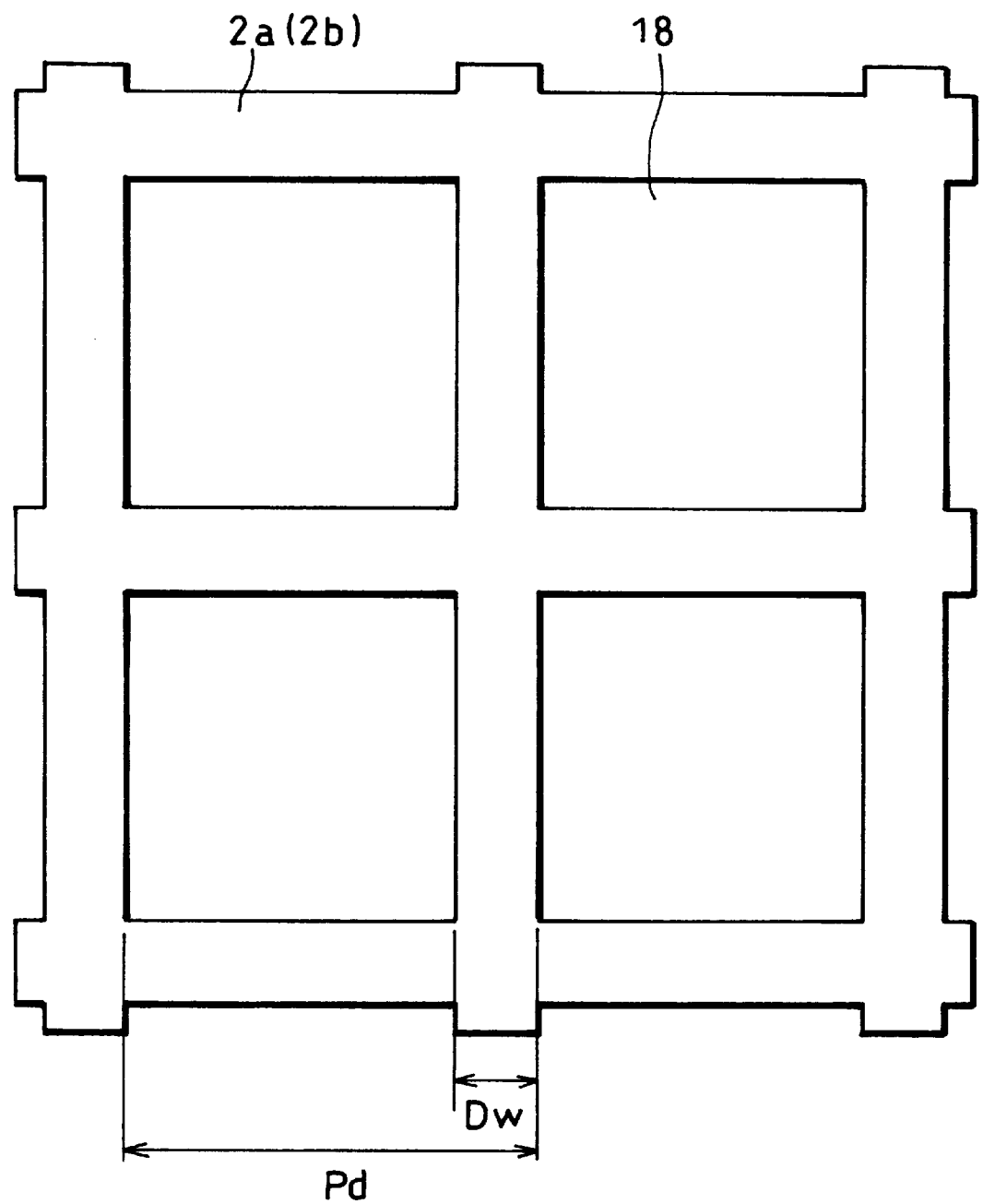
FIG. 18 is an explanatory drawing showing a fifth arrangement of holes in a transparent conductive film according to the present invention.
Figure 19:
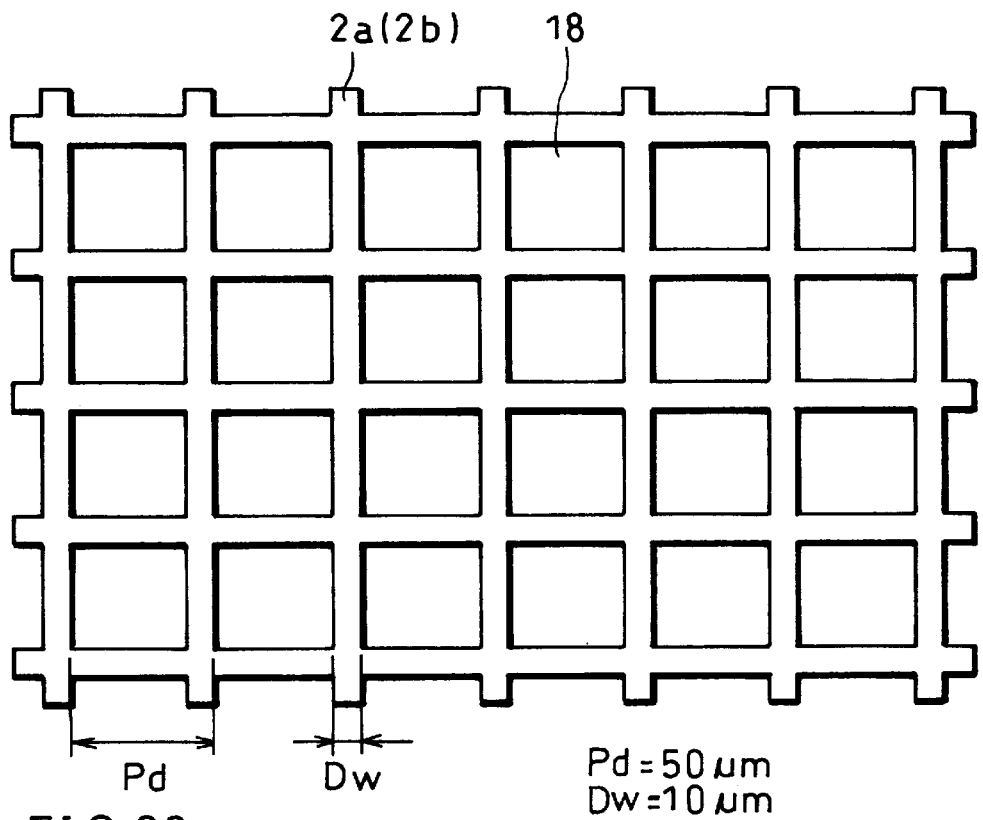
FIG. 19 is an explanatory drawing showing a sixth arrangement of holes in a transparent conductive film according to the present invention.

Next, the seventh embodiment of the present invention will be explained with reference to FIGS. 18 and 19. FIG. 18 is an explanatory drawing showing a fifth arrangement of the holes 18, and FIG. 19 is an explanatory drawing showing a sixth arrangement of the holes 18.

In the present embodiment, a touch panel was prepared with the same structure as that of the fifth embodiment, except for the holes 18.

For the present embodiment, touch panels with two arrangements of the holes 18 were prepared: (i) one with the arrangement shown in FIG. 18, of square holes each with a pitch Pd of 150 μm, an interval Dw of 30 μm, and sides of 120 μm (this arrangement hereinafter referred to as the "fifth arrangement"); and (ii) one with the arrangement shown in FIG. 19, of square holes each with a pitch Pd of 50 m, an interval Dw of 10 μm, and sides of 40 μm (this arrangement hereinafter referred to as the "sixth arrangement"). Then, input sensitivity and uniformity of input sensitivity by pixel were evaluated for each of these two touch panels, and for the touch panel with the first arrangement of the holes 18 according to the fifth embodiment, when they were mounted on a reflective-type liquid crystal display device. Table 7 shows the results of these evaluations.

Input sensitivity was evaluated by human perception, with touch panels having good input sensitivity shown by "○" and those having somewhat inferior input sensitivity shown by "Δ". Uniformity of input sensitivity was also evaluated by human perception, with good uniformity of input sensitivity shown by "○" and somewhat inferior uniformity of input sensitivity shown by "Δ".

The reflective-type liquid crystal display device used had a matrix arrangement of square pixels, each with a pitch P of 200 μm, a pixel interval D of 10 μm, and sides of 190 μm.

TABLE 7

| HOLES | INPUT SENSITIVITY | UNIFORMITY OF INPUT SENSITIVITY |
|---|---|---|
| FIRST ARRANGEMENT | ○ | ○ |
| FIFTH ARRANGEMENT | ○ | Δ |
| SIXTH ARRANGEMENT | ○ | ○ |

As shown in Table 7, the touch panel with the first arrangement of the holes 18 had good input sensitivity and uniformity of input sensitivity. The touch panel with the fifth arrangement had good input sensitivity, but uniformity of input sensitivity was somewhat inferior. The touch panel with the sixth arrangement had good input sensitivity and uniformity of input sensitivity.

In this way, uniformity of input sensitivity can be improved by setting the pitch Pd of the holes 18 at (1/n) with respect to the pitch P of the display device pixels, where n is an integer 1 or greater. For example, in the case of the first arrangement, the pitch Pd (=100 μm) of the holes 18 is (½) of the pitch P (=200 μm) of the display device pixels, and in the case of the sixth arrangement, the pitch Pd (=50 μm) of the holes 18 is (¼) of the pitch P (=200 μm) of the display device pixels.

Setting the pitch Pd of the holes 18 at (1/n) with respect to the pitch P of the display device pixels can equalize the input sensitivity for each pixel by ensuring that the area and shape occupied by the holes 18 is the same for each pixel.

Figure 20:
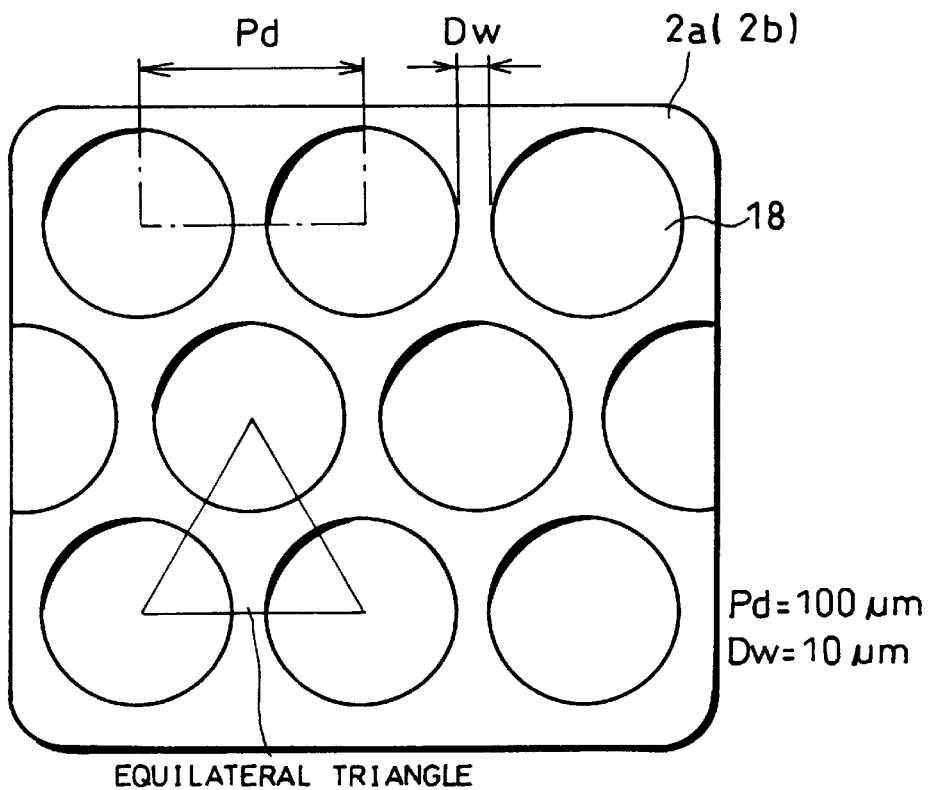
FIG. 20 is an explanatory drawing showing a seventh arrangement of holes in a transparent conductive film according to the present invention.
Figure 21:
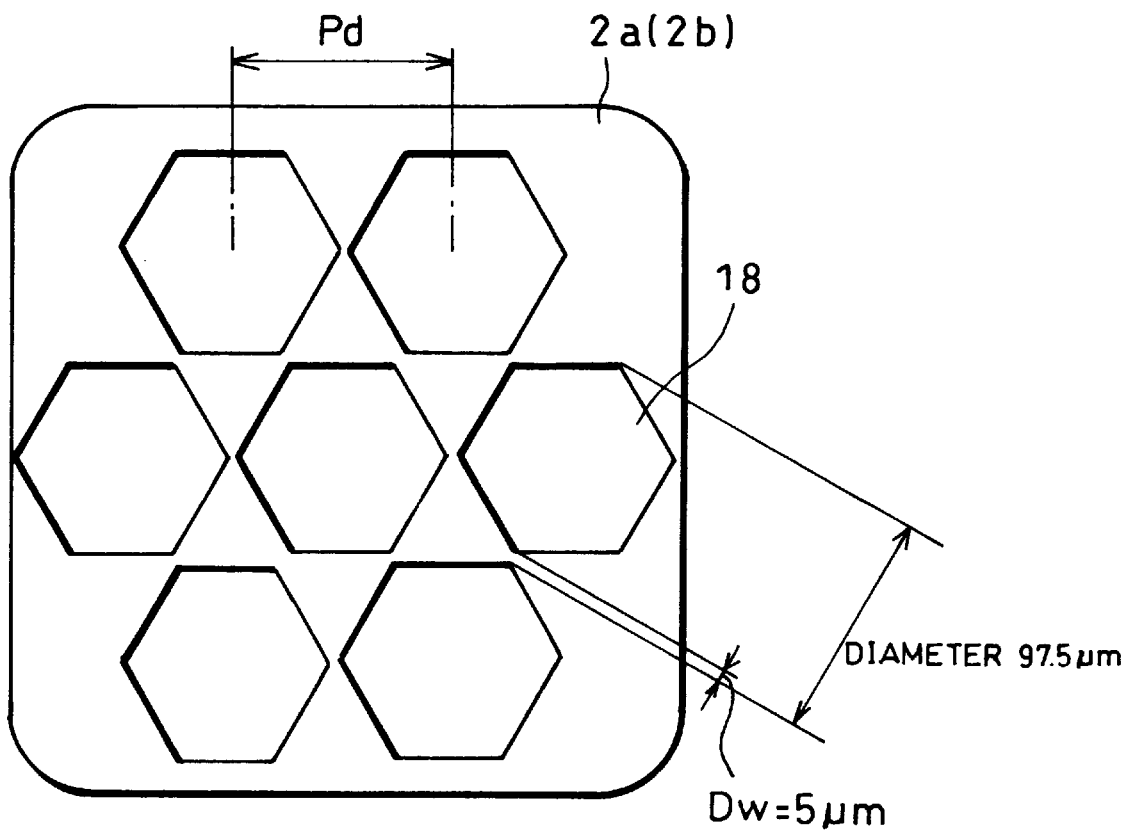
FIG. 21 is an explanatory drawing showing an eighth arrangement of holes in a transparent conductive film according to the present invention.

Next, the eighth embodiment of the present invention will be explained with reference to FIGS. 20 and 21. FIG. 20 is an explanatory drawing showing a seventh arrangement of the holes 18, and FIG. 21 is an explanatory drawing showing an eighth arrangement of the holes 18.

In the present embodiment, a touch panel was prepared with the same structure as that of the fifth embodiment, except for the holes 18.

For the present embodiment, touch panels with two arrangements of the holes 18 were prepared: (i) one with the arrangement shown in FIG. 20, of circular holes centered on the points of equilateral triangles with sides of 100 μm, each hole having a diameter of 90 μm, a pitch Pd of 100 μm and an interval Dw of 10 μm (this arrangement hereinafter referred to as the "seventh arrangement") ; and (ii) one with the arrangement shown in FIG. 21, of regular hexagonal holes inscribed within circles 97.5 μm in diameter, each hole having a pitch Pd of 100 μm and an interval Dw of 5 μm (this arrangement hereinafter referred to as the "eighth arrangement") Then, light transmittance and luminosity L* were measured for each of these two touch panels. The results of this measurement are shown in Table 8. Luminosity L* was measured with a Minolta CM-1000, with the touch panel unit placed on a standard white plate.

Further, Table 8 also shows the results of evaluation of the input sensitivity and uniformity of input sensitivity of each of these two touch panels when it was mounted on a reflective-type liquid crystal display device.

Input sensitivity was evaluated by human perception, with touch panels having good input sensitivity shown by "O" and those having somewhat inferior input sensitivity shown by "Δ". Uniformity of input sensitivity was also evaluated by human perception, with good uniformity of input sensitivity shown by "O" and somewhat inferior uniformity of input sensitivity shown by "Δ".

The reflective-type liquid crystal display device used had a matrix arrangement of square pixels, each with a pitch P of 200 μm, a pixel interval D of 10 μm, and sides of 190 μm.

thickness. Interference in the transparent conductive films 2a and 2b is a first-order interference only, and since the bottom of the interference curve is outside the visible portion, the influence of the interference within the visible portion causes high light transmittance.

While the surface resistance of the transparent conductive films in conventional touch panels is around 500 Ω/□ for a film thickness of 20 nm, the transparent conductive films 2a and 2b have a low surface resistance of around 50 Ω/□, because their film thickness is 150 nm. A surface resistance so low would usually impair the touch panels's positioning resolution, but in this case the resistance can be adjusted to an appropriate value by provision of the holes 18.

Since conventional touch panels use high-resistance films which are transparent conductive films with thin film thickness, slight unevenness in film thickness causes unevenness in the film's resistance, often impairing the touch panel's positioning resolution. However, the thicker transparent conductive films 2a and 2b provided in the

TABLE 8

| HOLES | LIGHT TRANSMITTANCE | LUMINOSITY L* | INPUT SENSITIVITY | UNIFORMITY OF INPUT SENSITIVITY |
|---|---|---|---|---|
| SEVENTH ARRANGEMENT | 88.4% | 92.3 | O | O |
| EIGHTH ARRANGEMENT | 88.5% | 92.4 | O | O |

As shown in Table 8, the touch panel with the seventh arrangement of the holes 18 had light transmittance of 88.4%, luminosity L* of 92.3, and good input sensitivity and uniformity of input sensitivity. The touch panel with the eighth arrangement of the holes 18 had light transmittance of 88.5%, luminosity L* of 92.4, and good input sensitivity and uniformity of input sensitivity.

As the foregoing shows, good input sensitivity and a bright display screen can both be obtained even with holes 18 of other than square shape. Further, uniformity of input sensitivity can be improved even with holes 18 of other than square shape by setting the pitch Pd of the holes 18 at (1/n) with respect to the pitch P of the display device pixels, where n is an integer 1 or greater.

Accordingly, the shape of the holes 18 need not be limited to square, and the same results can be obtained with circular, oval, or polygonal holes 18. Again, the holes 18 were provided on both of the transparent conductive films 2a and 2b, but the same effect can be obtained by providing the holes 18 on only one of the transparent conductive films 2a or 2b.

Figure 22:
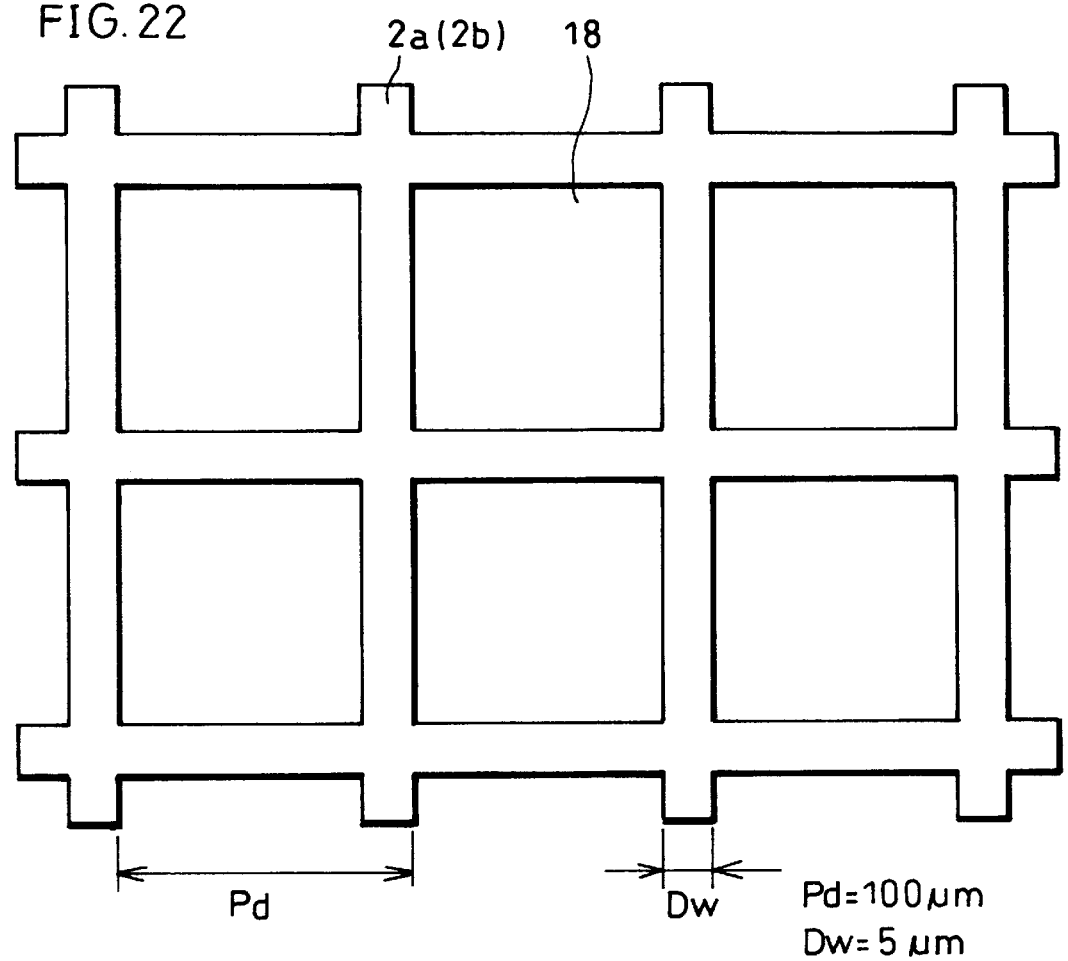
FIG. 22 is an explanatory drawing showing a ninth arrangement of holes in a transparent conductive film according to the present invention.
Figure 23:
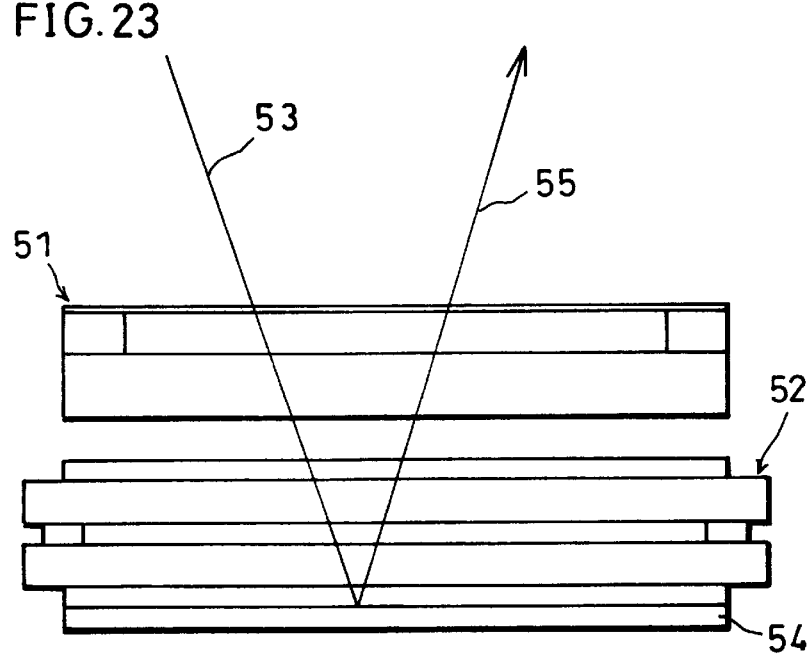
FIG. 23 is a cross-sectional view explaining the state of light when a touch panel is mounted on a reflective-type liquid crystal device.

Next, the ninth embodiment of the present invention will be explained with reference to FIG. 22. FIG. 22 is an explanatory drawing showing a ninth arrangement of the holes 18.

In the present embodiment, a touch panel was prepared with the same structure as that of the fifth embodiment, except for the holes 18 and the transparent conductive films 2a and 2b.

If the transparent conductive films 2a and 2b are to have a light transmittance peak at a wavelength of 550 nm (the wavelength with highest visibility for humans) and are made of ITO, a film thickness of approximately 150 nm must be used, since the refractive index of ITO is 1.90. This film thickness is derived from the relation nd=λ/2, where λ is the wavelength, n is the refractive index, and d is the film present embodiment reduce the influence of unevenness in resistance caused by slight unevenness in film thickness, and hold to a minimum the influence on the touch panel's positioning resolution.

For the present embodiment, a touch panel was prepared with the arrangement shown in FIG. 22, of square holes 18 with a pitch Pd of 100 μm, an interval Dw of 5 μm, and sides of 95 μm (hereinafter this arrangement being referred to as the "ninth arrangement"). Then, light transmittance, luminosity L*, input sensitivity, and uniformity of input sensitivity were evaluated when this touch panel was mounted on a reflective-type liquid crystal display device.

Luminosity L* was measured with a Minolta CM-1000, with the touch panel unit placed on a standard white plate. Input sensitivity and uniformity of input sensitivity were evaluated by human perception.

The reflective-type liquid crystal display device used had a matrix arrangement of square pixels, each with a pitch P of 200 μm, a pixel interval D of 10 μm, and sides of 190 μm. As discussed above, uniformity of input sensitivity can be improved by setting the pitch Pd of the holes 18 at (1/n) with respect to the pitch P of the display device pixels, where n is an integer 1 or greater. Accordingly, in the ninth arrangement, the pitch Pd of the holes 18 is (½) of the pitch P of the display device pixels.

Setting the pitch Pd of the holes 18 at (1/n) with respect to the pitch P of the display device pixels can equalize the input sensitivity for each pixel by ensuring that the area and shape occupied by the holes 18 is the same for each pixel.

This touch panel, in which the transparent conductive films 2a and 2b were each 150 nm thick, and the holes 18 were provided in the ninth arrangement, had light transmittance of 90.0%, luminosity L* of 90.0, and good input sensitivity and uniformity of input sensitivity.

As discussed above, a touch panel according to the present invention is a touch panel to be mounted on a display device and used as the input device thereof, and is made up of a pair of insulating substrates, each provided with a transparent conducting film, with selected areas of at least one of the transparent conducting films not provided with transparent conductive film (i.e., with holes selectively provided in the transparent conductive film).

With the foregoing structure, by providing the holes selectively in the transparent conductive film(s), the holes increase light transmittance, and make the display screen brighter. Further, since no anti-reflective films are provided on the transparent conductive film(s), the contact resistance between the two transparent conductive films is not increased, and the touch panel's input sensitivity is not impaired.

It is preferable to provide the holes as separate holes or in a lattice form. In this case, impairment of the touch panel's input sensitivity can be avoided, and the display screen can be made brighter.

It is preferable to set the percentage of the area of each pixel of the display device occupied by the holes at 10% or more, but less than 90%. In this case, impairment of the touch panel's input sensitivity can be avoided, the display screen can be made brighter, and each pixel can be given uniform input sensitivity.

It is preferable to set the pitch of the holes at (1/n) with respect to the pitch of the pixels, where n is an integer 1 or larger. In this case, impairment of the touch panel's input sensitivity can be avoided, the display screen can be made brighter, and the input sensitivity of each pixel can be made even more uniform.

In the touch panel discussed above, it is preferable if the film thickness of the transparent conductive films is set so that their peak light transmittance is at a wavelength of 550 nm. In this case, since light of 550 nm wavelength has the highest visibility for humans, the display screen can be made even brighter.

The concrete embodiments and examples of implementation discussed in the foregoing detailed explanations of the present invention serve solely to illustrate the technical details of the present invention, which should not be narrowly interpreted within the limits of such concrete examples, but rather may be applied in many variations without departing from the spirit of the present invention and the scope of the patent claims set forth below.

What is claimed is:

1. A touch panel to be mounted on a display device and used as an input device thereof, wherein said touch panel is a touch panel of a resistance film method, comprising:
   a pair of insulating substrates, each provided with a transparent conducting film; and
   an anti-reflective film provided on at least one of said transparent conducting films, wherein:
   said anti-reflective film is selectively provided on an input area of said touch panel.

2. The touch panel set forth in claim 1, wherein:
   said anti-reflective film is an insulating film having a refractive index of 1.41.

3. The touch panel set forth in claim 1, wherein:
   said anti-reflective film is provided so as to form a plurality of islets.

4. The touch panel set forth in claim 3, wherein:
   said anti-reflective film is provided so as to form square islets.

5. The touch panel set forth in claim 3, wherein:
   said anti-reflective film is provided so as to form circular islets arranged so that each is centered on a point of an equilateral triangle having sides of a predetermined length.

6. The touch panel set forth in claim 3, wherein:
   said anti-reflective film is provided so as to form regular hexagonal islets inscribed within circles having a predetermined diameter.

7. The touch panel set forth in claim 1, wherein:
   said anti-reflective film is provided so as to form a lattice.

8. The touch panel set forth in claim 1, wherein:
   said anti-reflective film is provided on each pixel of said display device, with an area percentage of each said pixel occupied by said anti-reflective film being 10% or more, but less than 90%.

9. The touch panel set forth in claim 3, wherein:
   said anti-reflective films are provided on each pixel of said display device, with an area percentage of each said pixel occupied by said anti-reflective films being 10% or more, but less than 90%.

10. The touch panel set forth in claim 8, wherein:
    said anti-reflective film has a pitch of (1/n) with respect to a pitch of said pixels, where n is an integer 1 or greater.

11. The touch panel set forth in claim 9, wherein:
    said anti-reflective films have a pitch of (1/n) with respect to a pitch of said pixels, where n is an integer 1 or greater.

12. A touch panel to be mounted on a display device and used as the input device thereof, said touch panel is a touch panel of a resistance film method, comprising:
    a pair of insulating substrates, each provided with a transparent conducting film, wherein:
    selected areas of at least one of said transparent conducting films are not provided with the transparent conducting film so as to be selectively provided on an input area of the touch panel.

13. The touch panel set forth in claim 12, wherein:
    said areas not provided with the transparent conductive film are provided so as to form a plurality of individual holes.

14. The touch panel set forth in claim 13, wherein:
    said areas not provided with the transparent conductive film are provided so as to form square holes.

15. The touch panel set forth in claim 13, wherein:
    said areas not provided with the transparent conductive film are provided so as to form circular holes arranged so that each is centered on a point of an equilateral triangle having sides of a predetermined length.

16. The touch panel set forth in claim 13, wherein:
    said areas not provided with the transparent conductive film are provided so as to form regular hexagonal holes inscribed within circles having a predetermined diameter.

17. The touch panel set forth in claim 12, wherein:
    said areas not provided are present on each pixel of said display device, with an area percentage of each said pixel occupied by said areas being 10% or more, but less than 90%.

18. The touch panel set forth in claim 13, wherein:
    said areas not provided are present on each pixel of said display device, with an area percentage of each said pixel occupied by said areas being 10% or more, but less than 90%.

19. The touch panel set forth in claim 17, wherein:
    said areas not provided with the transparent conductive film have a pitch of (1/n) with respect to a pitch of said pixels, where n is an integer 1 or greater.

20. The touch panel set forth in claim 18, wherein:

said areas not provided with the transparent conductive film have a pitch of (1/n) with respect to a pitch of said pixels, where n is an integer 1 or greater.

21. The touch panel set forth in claim 12, wherein:

said transparent conductive film has a film thickness such that peak light transmittance of said transparent conductive film is at a wavelength of 550 nm.

22. The touch panel set forth in claim 13, wherein:

said transparent conductive film has a film thickness such that peak light transmittance of said transparent conductive film is at a wavelength of 550 nm.

23. The touch panel set forth in claim 17, wherein:

said transparent conductive film has a film thickness such that peak light transmittance of said transparent conductive film is at a wavelength of 550 nm.

24. The touch panel set forth in claim 18, wherein:

said transparent conductive film has a film thickness such that peak light transmittance of said transparent conductive film is at a wavelength of 550 nm.

25. The touch panel set forth in claim 19, wherein:

said transparent conductive film has a film thickness such that peak light transmittance of said transparent conductive film is at a wavelength of 550 nm.

26. The touch panel set forth in claim 20, wherein:

said transparent conductive film has a film thickness such that peak light transmittance of said transparent conductive film is at a wavelength of 550 nm.

27. The touch panel set forth in claim 12, wherein said transparent conducting film provided with said selected areas is made of ITO with a film thickness of about 150 nm.

28. The touch panel set forth in claim 12, wherein said transparent conducting film provided with said selected areas having a sufficient film thickness so that an irregular resistance value caused by an uneven film thickness does not affect a positional resolution, and said selected areas are formed so as to set a resistance value of said transparent conducting film at a predetermined value.

* * * * *